United States Patent
Xu

(10) Patent No.: US 11,281,053 B2
(45) Date of Patent: Mar. 22, 2022

(54) DISPLAY PANEL, DISPLAY SUBSTRATE, AND MANUFACTURING METHOD THEREOF

(71) Applicant: TCL CHINA STAR OPTOELECTRONICS TECHNOLOGY CO., LTD., Guangdong (CN)

(72) Inventor: Zhiming Xu, Shenzhen (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 355 days.

(21) Appl. No.: 16/618,913

(22) PCT Filed: Nov. 26, 2019

(86) PCT No.: PCT/CN2019/120841
§ 371 (c)(1),
(2) Date: Dec. 3, 2019

(87) PCT Pub. No.: WO2021/093021
PCT Pub. Date: May 20, 2021

(65) Prior Publication Data
US 2022/0050319 A1 Feb. 17, 2022

(30) Foreign Application Priority Data

Nov. 14, 2019 (CN) .......................... 201911113332.X

(51) Int. Cl.
*G02F 1/1339* (2006.01)
(52) U.S. Cl.
CPC ...... *G02F 1/13398* (2021.01); *G02F 1/13394* (2013.01); *G02F 2202/025* (2013.01); *G02F 2202/36* (2013.01)

(58) Field of Classification Search
CPC .............. G02F 1/1339; G02F 1/13394; G02F 1/13398; G02F 2202/025; G02F 2202/36
See application file for complete search history.

(56) References Cited

U.S. PATENT DOCUMENTS 5,959,710 A * 9/1999 Yaniv ................. G02F 1/13394
349/155

OTHER PUBLICATIONS

English language translation of Chinese Patent Application Publication No. CN110231755 published on Sep. 13, 2019; translation downloaded from Espacenet at worldwide.espacenet.com on Jan. 4, 2021; translation provided by Google Translate tool onsite. (Year: 2018).*

* cited by examiner

*Primary Examiner* — Angela K Davison
(74) *Attorney, Agent, or Firm* — Benesch, Friedlander, Coplan & Aronoff LLP

(57) ABSTRACT

The present disclosure provides a display panel, a display substrate, and a manufacturing method thereof. The display substrate comprises a substrate, a first planar layer, and a BPS light-shielding layer. Wherein the BPS light-shielding layer is made of a composite material including polydopamine and graphene oxide, which can strengthen a binding force between the BPS light-shielding layer and the first planar layer and improve light-shielding effect of the BPS light-shielding layer. The manufacturing method of the display substrate is simple, and making liquid crystals uniformly filled, thereby improving display quality of panels.

19 Claims, 4 Drawing Sheets

DISPLAY PANEL, DISPLAY SUBSTRATE, AND MANUFACTURING METHOD THEREOF

FIELD OF INVENTION

The present disclosure relates to the field of display technologies, and more particularly, to a display panel, a display substrate, and a manufacturing method thereof.

BACKGROUND OF INVENTION

At present, a black photo spacer (BPS) light-shielding layer, in a display substrate of a liquid crystal display panel, is made of a new type of material, which has characteristics of conventional spacer materials, such as excellent elastic recovery and lower pollution to liquid crystals, and has characteristics of black matrix materials, such as a higher optical density (OD) value to shielding light.

Technical problem: bottom absorbance is less than top absorbance in current BPS materials of a display substrate. In practical manufacturing processes, it is hard to completely control shapes and bottom sizes of BPS materials, thereby causing problems of insufficient light-shielding and nonuniformity of filled liquid crystals.

Therefore, it is necessary to provide a new type of display substrate to solve the above problem.

SUMMARY OF INVENTION

The present disclosure provides a display panel, a display substrate, and a manufacturing method thereof, which can improve light-shielding effect of a BPS light-shielding layer in a display substrate and make liquid crystals in a display panel to be uniformly distributed. The technical problems of insufficient light-shielding and nonuniformity of filled liquid crystals caused by not easy to control shapes and bottom sizes of BPS materials in current technology can be solved.

To solve the above problem, the present disclosure provides following technical solutions:

the present disclosure provides a display substrate which comprises
a substrate;
a first planar layer disposed on one side of the substrate;
a BPS light-shielding layer disposed on one side surface of the first planar layer away from the substrate;
wherein the BPS light-shielding layer is made of a composite material including polydopamine and graphene oxide, the first planar layer is made of a photoresist material, and the BPS light-shielding layer comprises a plurality of matrix-distributed spacers.

In an embodiment of the present disclosure, the spacers are made of the composite material including polydopamine and graphene oxide.

In an embodiment of the present disclosure, in the composite material including polydopamine and graphene oxide, a mass ratio of graphene oxide to polydopamine ranges from 1:2 to 1:5.

In an embodiment of the present disclosure, the composite material including polydopamine and graphene oxide of the BPS light-shielding layer and the photoresist material of the first planar layer form a chemical bond.

In an embodiment of the present disclosure, the spacers are cylindrical.

In an embodiment of the present disclosure, the substrate is an array substrate.

In an embodiment of the present disclosure, the substrate is a color filter substrate.

The present disclosure provides a display substrate which comprises
a substrate;
a first planar layer disposed on one side of the substrate;
a BPS light-shielding layer disposed on one side surface of the first planar layer away from the substrate;
wherein the BPS light-shielding layer is made of a composite material including polydopamine and graphene oxide.

In an embodiment of the present disclosure, the BPS light-shielding layer comprises a plurality of matrix-distributed spacers made of the composite material including polydopamine and graphene oxide.

In an embodiment of the present disclosure, in the composite material including polydopamine and graphene oxide, a mass ratio of graphene oxide to polydopamine ranges from 1:2 to 1:5.

In an embodiment of the present disclosure, the first planar layer is made of a photoresist material, and the composite material including polydopamine and graphene oxide of the BPS light-shielding layer and the photoresist material of the first planar layer form a chemical bond.

In an embodiment of the present disclosure, the spacers are cylindrical.

In an embodiment of the present disclosure, the substrate is an array substrate.

In an embodiment of the present disclosure, the substrate is a color filter substrate.

The present disclosure provides a manufacturing method of a display substrate which comprises following steps:

step 1: providing a substrate, coating a first planar layer on one side of the substrate, and coating a second planar layer on one side surface of the first planar layer away from the substrate;

step 2: opening through-holes on the second planar layer and injecting a composite material including polydopamine and graphene oxide into the through-holes to form a black photo spacer (BPS) light-shielding layer;

step 3: stripping the second planar layer.

In an embodiment of the present disclosure, in the composite material including polydopamine and graphene oxide of the BPS light-shielding layer, a mass ratio of graphene oxide to polydopamine ranges from 1:2 to 1:5.

In an embodiment of the present disclosure, wherein in the step 2, a manufacturing step of the composite material including polydopamine and graphene oxide comprises:

step 10: mixing graphene oxide powders into a first solvent to obtain a graphene oxide dispersion solution;

step 20: adding dopamine powders and a second solvent into the graphene oxide dispersion solution to obtain a mixed solution of graphene oxide and polydopamine;

step 30: adding a condensing agent to the mixed solution of graphene oxide and polydopamine to obtain the composite material including polydopamine and graphene oxide.

In an embodiment of the present disclosure, wherein the step 10 further comprises filtering the graphene oxide dispersion solution, drying to obtain thin slices of graphene oxide, and mixing the thin slices of graphene oxide into the first solvent.

In an embodiment of the present disclosure, wherein in the step 20, a pH value of the mixed solution ranges from 7.0 to 9.0.

Beneficial effect: the beneficial effect of the present disclosure is that the present disclosure provides a display panel, a display substrate, and a manufacturing method thereof; the display substrate comprises a substrate, a first planar layer disposed on one side of the substrate, and a BPS light-shielding layer disposed on one side surface of the first planar layer away from the substrate; wherein the BPS light-shielding layer is made of a composite material including polydopamine and graphene oxide. Because the composite material including polydopamine and graphene oxide has physical adhesion, excellent strength and flexibility, and good light-shielding properties, it can strengthen a binding force between the BPS light-shielding layer and the first planar layer and make the BPS light-shielding layer have better light-shielding effect. The manufacturing method of the display substrate is simple that can save costs of equipment and processes. It can make liquid crystals uniformly filled when the display substrate is used in a display panel, thereby improving display quality.

DETAILED DESCRIPTION OF PREFERRED EMBODIMENTS

The specific embodiments described with reference to the attached drawings are all exemplary and are intended to illustrate and interpret the present disclosure.

An embodiment of the present disclosure can solve the technical problems of insufficient light-shielding and non-uniformity of filled liquid crystals caused by bottom absorbance in current BPS materials of a display substrate being less than top absorbance, and shapes and bottom sizes of BPS materials being not easy to control.

Figure 1:
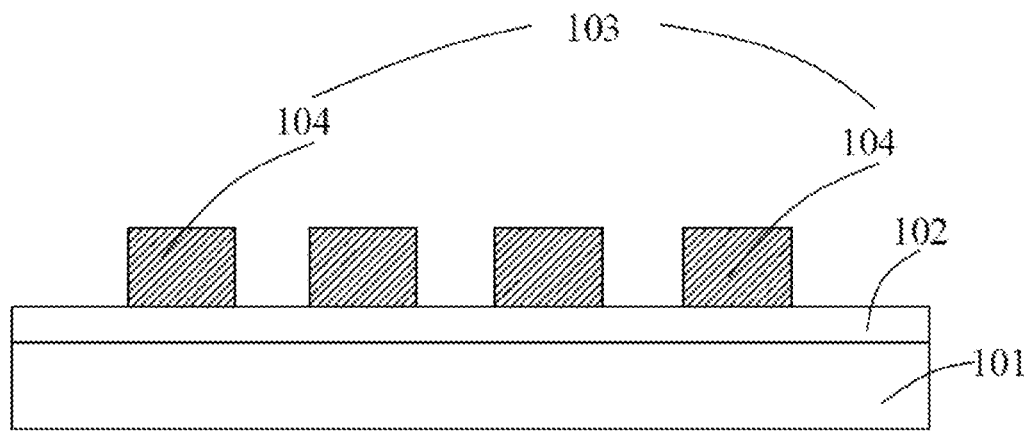
FIG. 1 is a schematic structural diagram of a display substrate according to an embodiment of the present disclosure.

Referring to FIG. 1, a display substrate provided by the present disclosure comprises a substrate 101, a first planar layer 102 disposed on one side of the substrate 101, and a BPS light-shielding layer 103 disposed on one side surface of the first planar layer 102 away from the substrate 101; wherein the BPS light-shielding layer 103 is made of a composite material including polydopamine and graphene oxide.

The BPS light-shielding layer 103 comprises a plurality of matrix distributed spacers 104 which are cured by a composite material including polydopamine and graphene oxide. A mass ratio of graphene oxide to polydopamine ranges from 1:2 to 1:5. The composite material including polydopamine and graphene oxide has excellent strength and flexibility. In another aspect, the composite material including polydopamine and graphene oxide is black and has a higher OD value that has a good light-shielding property. The composite material including polydopamine and graphene oxide has physical adhesion due to Hydrogen bonds and π-π conjugation effects. Furthermore, a surface of the composite material has a great amount of polar functional groups, such as oxygen-containing functional groups and amino groups, and the first planar layer 102 is made of polyfluoroalkoxy (PFA) which is a copolymer of perfluoropropyl perfluorovinyl ether with small amounts and polytetrafluoroethene, so the composite material including polydopamine and graphene oxide and PFA can form a chemical bond, thus enhancing the binding force between the BPS light-shielding layer 103 and the first planar layer 102.

The substrate 101 can be an array substrate. The substrate 101 comprises a substrate base; a buffer layer, a gate electrode, a source electrode, a drain electrode, an active layer, and a passivation layer disposed in sequence on one side surface of the substrate base. Wherein the first planar layer is disposed on one side surface of the passivation layer away from the substrate base. The substrate 101 can be a color filter substrate. The substrate 101 comprises a substrate base and a color filter layer disposed on one side surface of the substrate base. Wherein the first planar layer is disposed on one side surface of the color filter layer away from the substrate base. The substrate 101 can be a color filter on array (COA) type array substrate. That is a color filter is disposed on one side of an array substrate. The substrate 101 comprises a substrate base; a buffer layer, a gate electrode, a source electrode, a drain electrode, an active layer, and a passivation layer disposed in sequence on one side surface of the substrate base. Wherein a color resist layer is disposed on one side surface of the passivation layer away from the substrate base. Or the substrate can be other structures of array substrates or color filter substrates.

In an embodiment of the present disclosure, the spacers 104 are cylindrical, but in other embodiments, the spacers 104 can be shapes of an inverted ladder shape or a frustum shape with a greater lower side surface area and a smaller upper side surface area. Or the spacers 104 can be divided into two parts. For example, the spacers 104 comprises a first part and a second part, the first part is disposed on one side surface of the first planar layer 102 away from the substrate 101, the second part is disposed on one side surface of the first part away from the substrate 101, the first part can be a cuboid, the second part can be cylindrical, a greatest cross-sectional area of the first part is greater than a greatest cross-sectional area of the second part, a height of the first part is less than a height of the second part, and the first part can be a light-shielding layer, the second part can be spacers.

The display substrate provided by the present disclosure can improve interface bonding forces between the BPS light-shielding layer and the first planar layer, and strengthen light-shielding effect of the BPS light-shielding layer by using a composite material including polydopamine and graphene oxide, which has better physical adhesion, good light-shielding properties, and excellent strength and flexibility, as the BPS light-shielding layer in the display substrate.

The present disclosure further provides a display panel which comprises the above display substrate.

Figure 2:
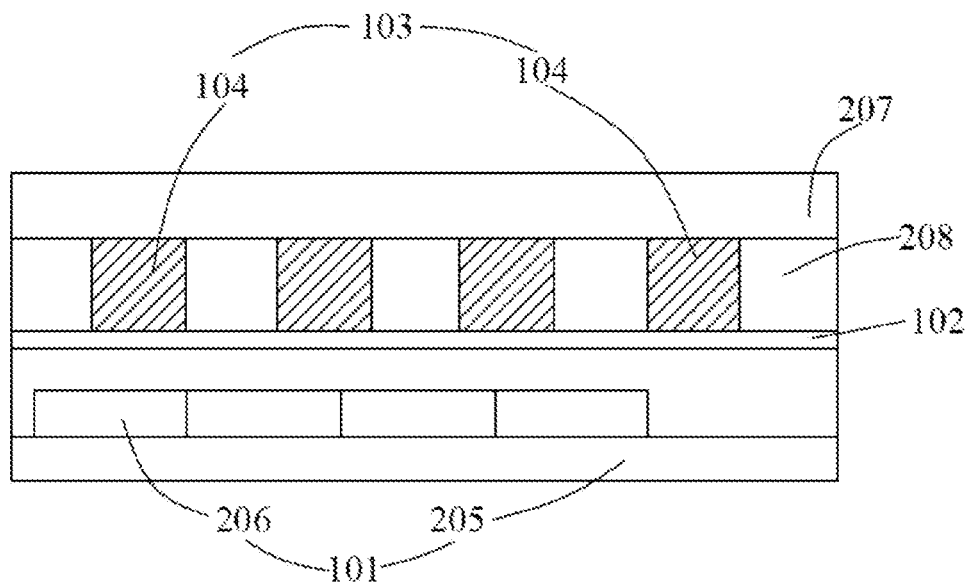
FIG. 2 is a schematic structural diagram of a display panel according to an embodiment of the present disclosure.
Figure 3:
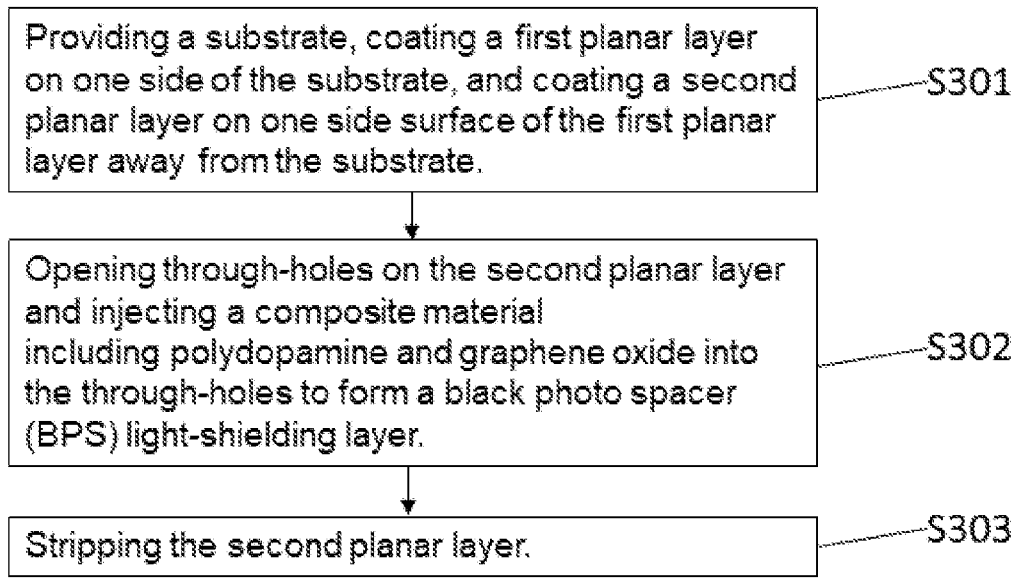
FIG. 3 is a flowchart of a manufacturing method of the display substrate according to an embodiment of the present disclosure.
Figure 4A:
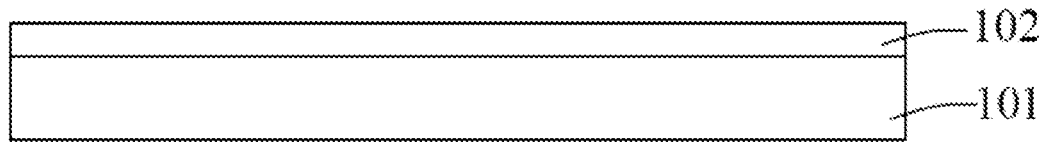
FIG. 4A to FIG. 4E are schematic structural diagrams of the display substrate in a manufacturing process according to an embodiment of the present disclosure.
Figure 4B:
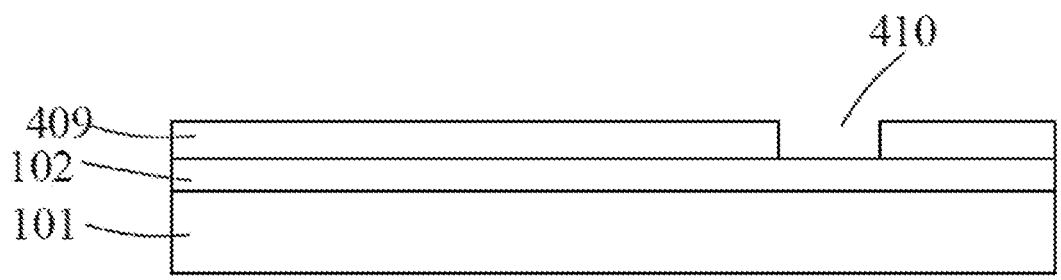
Figure 4C:
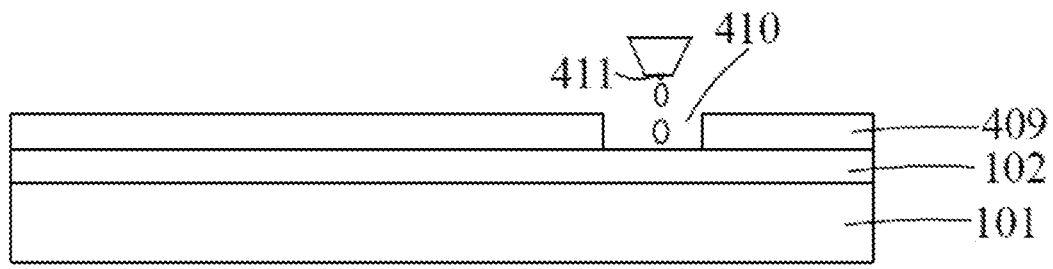
Figure 4D:
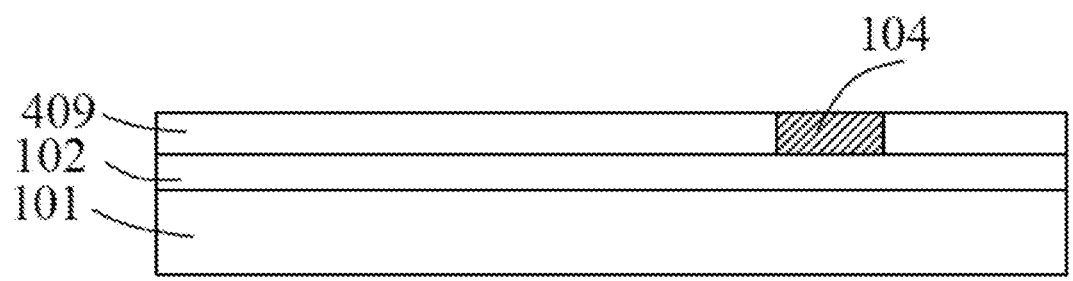
Figure 4E:
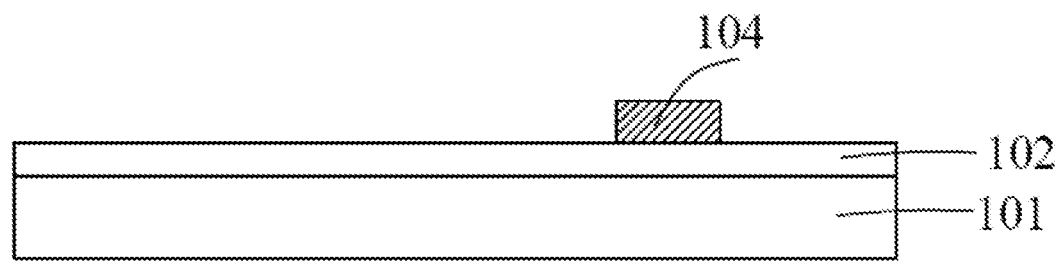

Referring to FIG. 2, take the substrate of the display substrate according to the above embodiment as an array substrate for example. The array substrate is a COA array substrate. That is a color filter layer is disposed on one side of the array substrate. The display panel comprises a display substrate and a color filter substrate disposed opposite to the display substrate, and a liquid crystal layer is disposed between the display substrate and the color filter substrate.

The display substrate comprises the substrate 101 which is a COA array substrate. The substrate 101 comprises a substrate base and film layers 205 of a buffer layer, a gate electrode, a source electrode, a drain electrode, an active layer, and a passivation layer disposed in sequence on one side surface of the substrate base. The substrate 101 further comprises a color filter layer 206 disposed on one side surface of the film layers 205 away from the substrate base. The first planar layer 102 and the BPS light-shielding layer 103 are disposed in sequence on one side surface of the color filter layer 206 away from the substrate base.

Wherein the color filter layer 206 comprises a plurality of filter units with different colors. The BPS light-shielding layer 103 can be used to define a boundary between each of the filter units that prevents adjacent filter units occurring light-leakage. The spacers 104 of the BPS light-shielding layer 103 are in contact with a side surface of the color filter substrate 207 adjacent to the display substrate, and the spacers 104 are disposed in liquid crystals 208 for isolation and support.

Or the substrate of the display substrate according to the above embodiment is an array substrate. The display panel comprises a display substrate and a color filter substrate disposed opposite to the display substrate, and a liquid crystal layer is disposed between the display substrate and the color filter substrate. The display substrate comprises a substrate which is an array substrate. The substrate comprises a substrate base and film layers of a buffer layer, a gate electrode, a source electrode, a drain electrode, an active layer, and a passivation layer disposed in sequence on one side surface of the substrate base. A first planar layer is disposed on one side surface of the passivation layer away from the substrate base, and a BPS light-shielding layer is disposed on one side surface of the first planar layer away from the substrate base.

The spacers of the BPS light-shielding layer are in contact with a side surface of the color filter substrate adjacent to the display substrate, and the spacers are disposed in liquid crystals for isolation and support.

Or the substrate of the display substrate according to the above embodiment is a color filter substrate. The display panel comprises a display substrate and an array substrate disposed opposite to the display substrate, and a liquid crystal layer is disposed between the display substrate and the array substrate. The display substrate comprises a substrate which is a color filter substrate. The substrate comprises a substrate base, a color filter layer is disposed on one side surface of the substrate base, a first planar layer is disposed on one side surface of the color filter layer away from the substrate base, a BPS light-shielding layer is disposed on one side surface of the first planar layer, and a common electrode is disposed on one side of the BPS light-shielding layer away from the substrate base.

Wherein the color filter layer comprises a plurality of filter units with different colors. The BPS light-shielding layer can be used to define a boundary between each of the filter units that prevents adjacent filter units from occurring light-leakage. The spacers of the BPS light-shielding layer are in contact with a side surface of the array substrate adjacent to the display substrate, and the spacers are disposed in liquid crystals for isolation and support.

In other embodiments, the substrate of the display panel can be other structures of array substrates or color filter substrates. A structure of the display panel is similar to the display panel in the above embodiments.

The present disclosure provides a display panel by using a composite material including polydopamine and graphene oxide as a BPS light-shielding layer. The composite material has excellent strength and flexibility, so it can make liquid crystals uniformly distributed when as spacers. Furthermore, the composite material has a greater OD value, so it has good light-shielding properties to make a BPS light-shielding layer have better light-shielding effect.

Referring to FIG. 3 and FIG. 4A to FIG. 4E, the present disclosure further provides a manufacturing method of the display substrate. The method comprises following steps:

S301: providing a substrate 101, coating a first planar layer 102 on one side of the substrate 101, and coating a second planar layer 409 on one side surface of the first planar layer 102 away from the substrate 101.

The substrate 101 can be any structures of array substrates or color filter substrates. Materials of the first planar layer 102 and the second planar layer 409 are the same and are PFA which is a copolymer of perfluoropropyl perfluorovinyl ether with small amounts and polytetrafluoroethene. PFA can be a photoresist material and has good insulation and corrosion resistance, so in the display substrate, PFA can also function as insulation.

S302: opening through-holes 410 on the second planar layer 409 and injecting a composite material 411 including polydopamine and graphene oxide into the through-holes 410 to form a black photo spacer (BPS) light-shielding layer.

Specifically, it can use laser or other methods to open a plurality of through-holes 410 on the second planar layer 409. The through-holes 410 are array distributed. Ink jet printing or other methods can be used to inject the composite material 411 including polydopamine and graphene oxide into each of the through-holes 410, and then the composite material 411 including polydopamine and graphene oxide is heated at a temperature ranging from 45° C. to 80° C. to be cured. The cured composite material 411 including polydopamine and graphene oxide forms spacers 104, and a plurality of the spacers 104 are array distributed to form the BPS light-shielding layer. It should be noted that, sizes and heights of the spacers 104 should be in consistent with the through-holes 410, and shapes thereof should be the same. That is, if openings of the through-holes 410 are cylindrical, then shapes of the spacers 104 will also be cylindrical. If shapes of the spacers 104 need to be other shapes, such as an inverted ladder shape or a frustum with narrow top and wide bottom, it can be obtained by changing shapes of the through-holes 410 when manufacturing.

Wherein, in the composite material 411 including polydopamine and graphene oxide, a mass ratio of graphene oxide to polydopamine ranges from 1:2 to 1:5. Due to a higher OD value, the composite material 411 including polydopamine and graphene oxide has good light-shielding properties to act as better light-shielding effect. Meanwhile, a surface of the composite material 411 including polydopamine and graphene oxide has a great amount of polar functional groups, such as oxygen-containing functional groups and amino groups, to form chemical bonds with materials of the first planar layer 102, and the composite material 411 including polydopamine and graphene oxide has Hydrogen bonds and π-π conjugation effects to greatly improve interface adhesion between the BPS light-shielding layer and the first planar layer. There are strong chemical amide bonds among polydopamine and graphene oxide in the composite material 411 including polydopamine and graphene oxide, making the composite material 411 including polydopamine and graphene oxide has excellent strength and flexibility, and having support and isolation effects when as spacers.

S303: stripping the second planar layer 409.

Specifically, the second planar layer 409 is subjected to exposure and development by using a particular mask during the process, then a photoresist stripping process is performed. The cured composite material 411 including polydopamine and graphene oxide can be patterned by the mask in the step to obtain needed patterns of the spacers 104.

Figure 5:
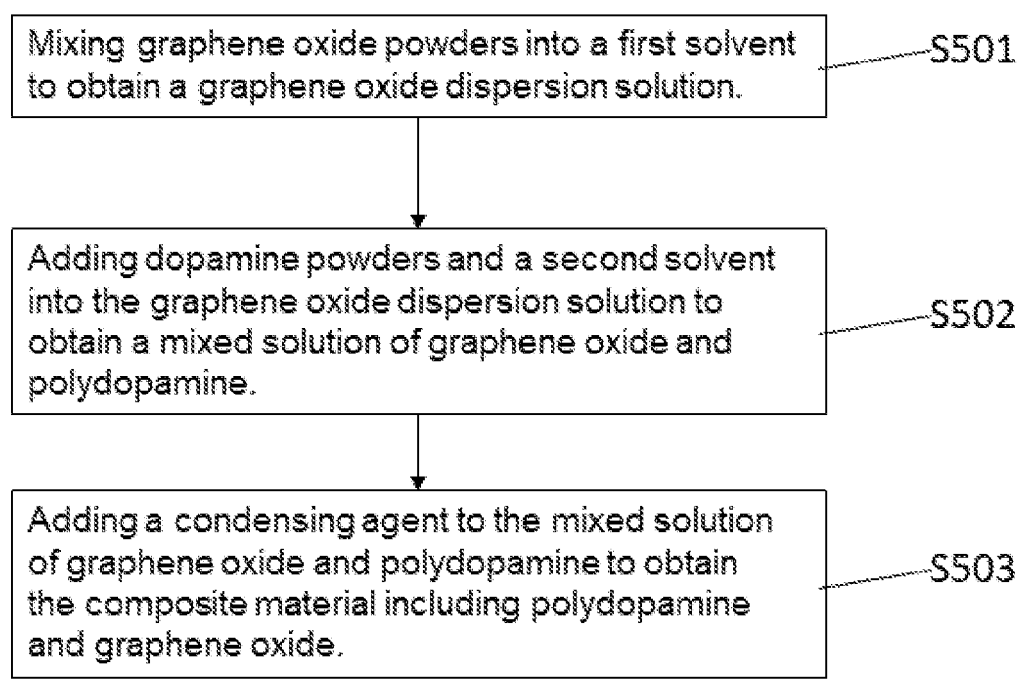
FIG. 5 is a flowchart of a manufacturing method of a BPS light-shielding layer of the display substrate according to an embodiment of the present disclosure.

Referring to FIG. 5, in the manufacturing method of the display substrate provided by the present disclosure, a specific manufacturing method of the composite material including polydopamine and graphene oxide comprises following steps:

S501: mixing graphene oxide powders into a first solvent to obtain a graphene oxide dispersion solution.

Wherein the first solvent is deionized water, and the graphene oxide powders are prepared by Hummers method. The specific manufacturing process is: providing a 250 mL beaker and adding ice into the beaker to provide Ice water bath; using a test tube to measure 23 mL of concentrated sulfuric acid, and then weighing 1 g of graphite, 0.5 g of sodium nitrate, and 3 g of potassium permanganate with an electronic balance; adding the weighed graphite to another prepared conical flask, pouring concentrated sulfuric acid gently, and then placing the conical flask on an electromagnetic stirrer; mixing graphite and sodium nitrate and adding to the conical flask to stir and react for 3 minutes, then adding potassium permanganate to the conical flask; continuing to stir and react for 2 hours under a temperature less than 20° C., then continuing to stir for 30 minutes under 35° C.; preparing 46 mL of deionized water at 14° C.; after reacting for 30 minutes, adding the deionized water to the conical flask, then rising the temperature to 98° C. to heat continuously for 20 minutes. The solution is brown yellow and emits red smoke. Then adding 5 g of 30% hydrogen peroxide to the conical flask. Taking off the flask and filtering when it is hot, then washing with dilute hydrochloric acid and deionized water. After remaining solids are stabilized on the filter paper, removing the filter paper with tweezers, lining the bottom with a clean filter paper, and placing them in a dry oven at 60° C. for drying to obtain brown thin slices of graphite oxide with edges having derivative carboxylic acid groups and mainly having phenolic hydroxyl groups and epoxy groups on the plane. After that, the thin slices of graphite oxide are vigorously stirred and stripped by ultrasound or high shear to obtain the graphene oxide powders.

The graphene oxide powders are mixed with the first solvent at a ratio of 1:1000 to obtain a brown yellow suspension solution. After that, the mixed solution is placed into an ultrasonic cleaning tank to disperse by ultrasound for one hour to obtain the graphene oxide dispersion solution, and the graphene oxide dispersion solution is brown.

S502: adding dopamine powders and a second solvent into the graphene oxide dispersion solution to obtain a mixed solution of graphene oxide and polydopamine.

Wherein, the second solvent is a weak alkaline reagent, such as Tris reagent. A pH value of the mixed solution is adjusted to 7.0 to 9.0 by the second solvent. Wherein pH 8.5 is the best. The second solvent makes the mixed solution of graphene oxide and dopamine becomes weak alkaline, and in the weak alkaline environment, dopamine can react and self-polymerize to form polydopamine. This is because in the weak alkaline condition, hydrogen ions produced from self-polymerization of dopamine can be consumed, thereby making equilibrium move to the direction of polymerization.

S503: adding a condensing agent to the mixed solution of graphene oxide and polydopamine to obtain the composite material including polydopamine and graphene oxide.

The condensing agent can be NHS, EDC, or other effective condensing agents. Graphene oxide and polydopamine can have chemical cross-linking reaction to form chemical amide bonds when the condensing agent is existed, and the solution is black. Due to the composite material of polydopamine and graphene oxide containing strong chemical bonds and having effects of hydrogen bonds and π-π conjugations, the composite material of polydopamine and graphene oxide has excellent strength and flexibility.

The manufacturing method of the display substrate is simple that can save costs of equipment and processes. The composite material including polydopamine and graphene oxide has excellent characteristics and better strength and flexibility. The manufacturing method of the composite material including polydopamine and graphene oxide is simple. The composite material can improve interface bonding forces between a BPS light-shielding layer and a planar layer when being a BPS light-shielding layer, and the composite material has good light-shielding properties to improve light-shielding effect of a BPS light-shielding layer.

The beneficial effect of the present disclosure is that: the present disclosure provides a display panel, a display substrate, and a manufacturing method thereof; the display substrate comprises a substrate, a first planar layer disposed on one side of the substrate, and a BPS light-shielding layer disposed on one side surface of the first planar layer away from the substrate; wherein the BPS light-shielding layer is made of a composite material including polydopamine and graphene oxide. Because the composite material including polydopamine and graphene oxide has physical adhesion, excellent strength and flexibility, and good light-shielding properties, it can strengthen a binding force between the BPS light-shielding layer and the first planar layer and make the BPS light-shielding layer have better light-shielding effect. The manufacturing method of the display substrate is simple that can save costs of equipment and processes. It can make liquid crystals uniformly filled when the display substrate is used in a display panel, thereby improving display quality.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. A display substrate, comprising:
   a substrate;
   a first planar layer disposed on one side of the substrate;
   a black photo spacer (BPS) light-shielding layer disposed on one side surface of the first planar layer away from the substrate;
   wherein the BPS light-shielding layer is made of a composite material including polydopamine and graphene oxide.

2. The display substrate according to claim 1, wherein the BPS light-shielding layer comprises a plurality of matrix-distributed spacers made of the composite material including polydopamine and graphene oxide.

3. The display substrate according to claim 2, wherein the substrate is an array substrate.

4. The display substrate according to claim 2, wherein the substrate is a color filter substrate.

5. The display substrate according to claim 2, wherein in the composite material including polydopamine and graphene oxide, a mass ratio of graphene oxide to polydopamine ranges from 1:2 to 1:5.

6. The display substrate according to claim 5, wherein the first planar layer is made of a photoresist material, and the composite material including polydopamine and graphene oxide of the BPS light-shielding layer and the photoresist material of the first planar layer form a chemical bond.

7. The display substrate according to claim 5, wherein the spacers are cylindrical.

8. A display substrate, comprising:
   a substrate;
   a first planar layer disposed on one side of the substrate;
   a black photo spacer (BPS) light-shielding layer disposed on one side surface of the first planar layer away from the substrate;
   wherein the BPS light-shielding layer is made of a composite material including polydopamine and graphene oxide, the first planar layer is made of a photoresist material, and the BPS light-shielding layer comprises a plurality of matrix-distributed spacers.

9. The display substrate according to claim 8, wherein the composite material including polydopamine and graphene oxide of the BPS light-shielding layer and the photoresist material of the first planar layer form a chemical bond.

10. The display substrate according to claim 8, wherein the substrate is an array substrate.

11. The display substrate according to claim 8, wherein the substrate is a color filter substrate.

12. The display substrate according to claim 8, wherein the spacers are made of the composite material including polydopamine and graphene oxide.

13. The display substrate according to claim 12, wherein in the composite material including polydopamine and graphene oxide, a mass ratio of graphene oxide to polydopamine ranges from 1:2 to 1:5.

14. The display substrate according to claim 12, wherein the spacers are cylindrical.

15. A manufacturing method of a display substrate, comprising following steps:

step 1: providing a substrate, coating a first planar layer on one side of the substrate, and coating a second planar layer on one side surface of the first planar layer away from the substrate;

step 2: opening through-holes on the second planar layer and injecting a composite material including polydopamine and graphene oxide into the through-holes to form a black photo spacer (BPS) light-shielding layer;

step 3: stripping the second planar layer.

16. The manufacturing method of the display substrate according to claim 15, wherein in the composite material including polydopamine and graphene oxide of the BPS light-shielding layer, a mass ratio of graphene oxide to polydopamine ranges from 1:2 to 1:5.

17. The manufacturing method of the display substrate according to claim 15, wherein in the step 2, a manufacturing step of the composite material including polydopamine and graphene oxide comprises:

step 10: mixing graphene oxide powders into a first solvent to obtain a graphene oxide dispersion solution;

step 20: adding dopamine powders and a second solvent into the graphene oxide dispersion solution to obtain a mixed solution of graphene oxide and polydopamine;

step 30: adding a condensing agent to the mixed solution of graphene oxide and polydopamine to obtain the composite material including polydopamine and graphene oxide.

18. The manufacturing method of the display substrate according to claim 17, wherein the step 10 comprises filtering the graphene oxide dispersion solution, drying to obtain thin slices of graphene oxide, and mixing the thin slices of graphene oxide into the first solvent.

19. The manufacturing method of the display substrate according to claim 17, wherein in the step 20, a pH value of the mixed solution ranges from 7.0 to 9.0.

* * * * *